United States Patent [19]

Stoepfel

[11] Patent Number: 5,052,222
[45] Date of Patent: Oct. 1, 1991

[54] MULTIPLE-UNIT WATER DEPTH SENSOR SYSTEM

[75] Inventor: Daniel L. Stoepfel, Houston, Tex.

[73] Assignee: Teledyne Exploration, Houston, Tex.

[21] Appl. No.: 609,417

[22] Filed: Nov. 5, 1990

[51] Int. Cl.⁵ .............................................. G01F 23/14
[52] U.S. Cl. ...................................... 73/302; 73/299; 114/244
[58] Field of Search .................... 73/290 R, 299, 301, 73/302 V; 137/386, 403; 114/244 X, 245

[56] References Cited

U.S. PATENT DOCUMENTS

| | | | |
|---|---|---|---|
| 2,658,389 | 11/1953 | Eby | 73/302 |
| 3,613,456 | 10/1971 | Hapfe et al. | 73/302 X |
| 3,780,581 | 12/1973 | Acre et al. | 73/302 |
| 3,987,675 | 10/1976 | Harrison | 73/302 |
| 4,388,827 | 6/1983 | Palmer et al. | 73/302 |
| 4,409,833 | 10/1983 | Thomson et al. | 73/299 X |
| 4,625,548 | 12/1986 | Charter | 73/299 |
| 4,669,309 | 6/1987 | Cornelius | 73/299 |
| 4,726,315 | 2/1988 | Bell et al. | 144/244 |
| 4,908,801 | 3/1990 | Bell et al. | 367/23 |

FOREIGN PATENT DOCUMENTS

| | | | |
|---|---|---|---|
| 73732 | 4/1978 | Japan | 73/302 |
| 210724 | 10/1985 | Japan | 73/302 |
| 607112 | 5/1978 | U.S.S.R. | 73/302 |

Primary Examiner—William A. Cuchlinski, Jr.
Assistant Examiner—G. Bradley Bennet
Attorney, Agent, or Firm—William A. Knox

[57] ABSTRACT

Each unit of an array of submerged oceanographic devices is provided with a depth gauge of the air bubbler type. A typical depth gauge consists of a tube or air line that has one end fluidly coupled to a manifold; the other end of the air line is open. The open end of the air line is secured adjacent a corresponding submerged device. A small flow of air is established from the manifold, through the air line, to bubble out the open end into the water. A pressure transducer is fluidly coupled to the air line and senses the backpressure due to the hydrostatic water head existing above the submerged device. Means are provided for inhibiting pneumatic cross feed in the manifold between the respective air lines.

6 Claims, 1 Drawing Sheet

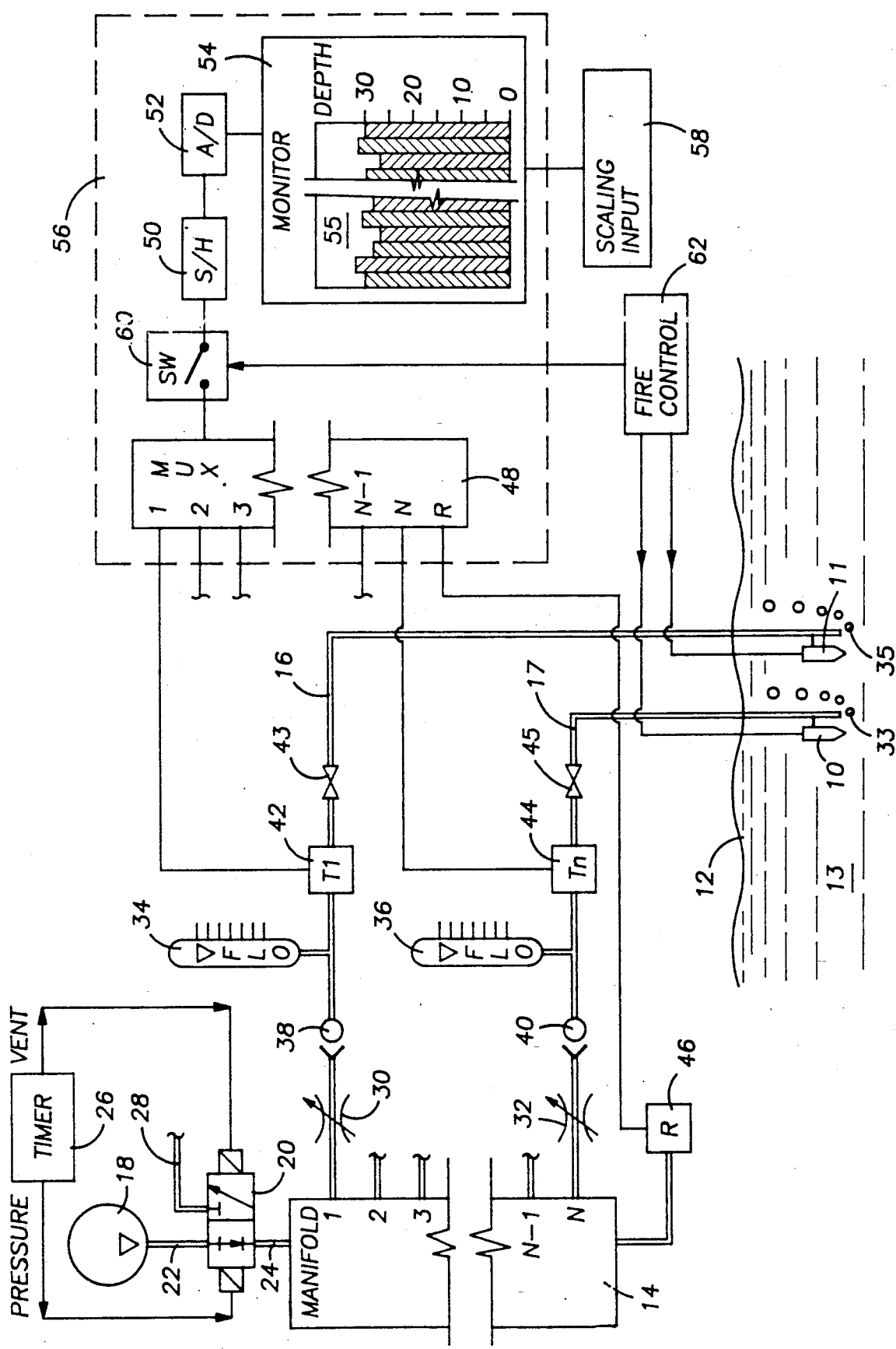

MULTIPLE-UNIT WATER DEPTH SENSOR SYSTEM

BACKGROUND OF THE INVENTION

1. Technical Field of the Invention

This invention is an open-tube water-depth sensor for use with oceanographic equipment in general. It has particular use with the depth measurement of arrays of acoustic sources as used in seismic exploration.

2. Discussion of the Prior Art

Oceanographers employ submerged sensors that are towed behind a ship during a marine survey. To make meaningful measurements at sea, the depth of the sensors in the water must be continuously monitored. In a more specific application, in seismic exploration, an array of seismic sound sources such as air guns or water guns is towed behind the ship. In the case of air guns, the guns are charged with air under a high pressure of about 2000 psi. Periodically, the guns are fired to create a thunderous shock pulse in the water. The shock pulse generates an acoustic wave field. The wave field propagates downwardly through the water and into earth layers beneath the sea. The acoustic waves are reflected from the sub-bottom earth layers, whence they return to the surface to be detected by hydrophones near the water surface. See for example, U.S. Pat. No. 4,908,801, issued Mar. 13, 1990 to the assignee of this invention. That patent is incorporated herein by reference as a teaching of one aspect the seismic art.

In that patent, it was explained that the depth of the air guns needs to be known accurately because the gun depth has a profound influence on the wave shape of the acoustic pulses. Therefore, each gun has a depth sensor attached thereto. The type of sensor generally used in the seismic industry, such as the TXC-D1 mentioned in the '801 patent, has a variable reluctance active element. I have found that variable reluctance depth transducers are unreliable for precision work. The response is non-linear and the element suffers from hysteresis. Furthermore, the shock wave that is created when the guns are fired, often damages or destroys the depth sensor. Although more sensitive and accurate devices are known, they are too delicate to be mounted on an air gun.

U.S. Pat. No. 4,726,315, assigned to the assignee of this invention, is also incorporated herein by reference as a teaching of the manner and techniques by which oceanographic devices such as arrays of air guns and other seismic equipment are towed behind an exploration ship at sea.

A type of depth sensor is disclosed in U.S. patent application Ser. No. 4,388,827, issued June 21, 1983 to C. E. Kinzer et al. Here, a tube, open at one end, is connected to a source of pressurized gas at the other end. The open end is located at the bottom of a liquid body. Periodically, a flow of pressurized gas is applied to the pipe so as to bubble out the open end of the pipe that is located at the bottom of the water. After the air flow is cut off, the back pressure in the pipe, due to the hydrostatic head, is an analog of the water depth. That method has the virtues of simplicity and linearity of response but it is useful only for making single measurements in a benign environment.

SUMMARY OF THE INVENTION

In accordance with this invention, I provide a water depth sensor system for use in measuring the depth of submergence of each of a plurality of submersible oceanographic devices such as seismic sound sources which may be air guns, that are arranged in a towed array The system includes a pneumatically pressurized manifold to which are attached a plurality of air lines, one end of which are in fluid communication therewith. The other, free end of each air line is open; the open end of each air line is secured adjacent to a corresponding oceanographic device. Means are provided for establishing a flow of air between the manifold and the open end of each air line. Means are provided for inhibiting pneumatic cross feed, within the manifold, between the respective air lines. A pressure transducer, fluidly coupled to each air line, in combination with a reference pressure transducer that is fluidly coupled to the manifold, furnishes an electrical difference signal that is a measure of the pressure drop across the cross feed inhibiting means installed in each air line. The measured pressure drop is an analog of the water depth of the corresponding oceanographic devices. The electrical signal representing the pressure drop may be scaled to provide a direct measure of the water depth. The depth of submergence of the respective devices may be displayed in the form of a bar graph on a TV monitor.

In an aspect of this invention, the oceanographic devices are seismic acoustic sources such as air guns or water guns. The air lines act as a low pass filter to attenuate the force of the high-frequency shock wave when the guns are fired, thereby to prevent damage to the pressure transducer attached to that air line.

In another aspect of this invention, each air line includes means for preventing water invasion of the manifold when an associated air gun is fired.

BRIEF DESCRIPTION OF THE DRAWING

These and other benefits and advantages of my invention will be better appreciated by reference to the detailed description and the sole drawing wherein is shown the essential elements of the Multi-sensor Depth Monitoring System.

DETAILED DESCRIPTION OF THE PREFERRED EMBODIMENT

In the drawing and in the present text, no attempt will be made to show and describe the principles and practice of deploying oceanographic equipment used in seismic exploration. That information has been adequately disclosed in the two patents cited earlier. When reference is made to a pressure measurement, it is to be understood that gauge pressure is meant, not absolute pressure.

In the Figure, oceanographic devices, such as seismic acoustic sources which may be air guns, represented as 10 and 11, are towed beneath the surface 12 of a body of water 13 by any well-known means such as described in the '315 reference. Aboard the towing ship along with other ancillary equipment, there is an air manifold 14 to which are attached a plurality of air lines, 16, 17, one end of each of which is in fluid communication with the manifold, the other end being open. Preferably the air lines are flexible plastic tubes that have an internal diameter of about an eighth to a quarter of an inch. The plastic air lines are enclosed in protective armoring along with the hose bundle that includes high pressure air lines and electrical control lines to the air guns. Two such air lines are shown but 24 to 32 may be used in practice depending on the number of sound sources in an array. In the drawing, air lines are represented by double lines; electrical signal lines are shown as single lines.

Air is supplied to the manifold by pump 18 through a two position, three port solenoid valve 20 and lines 22 and 24, to establish a flow of air between the manifold and the air lines 16 and 17. A programmable timer 26, such as the Model 4600 Repeat Timer, made by Artisan Electronics Corp. of Parsippany, N.J., alternately pressurizes manifold 14 (in the position shown) or vents the manifold through vent pipe 28 for reasons to be explained later.

The respective sound or acoustic sources, such as 10 and 11 are not necessarily all at the same depth. Therefore, the hydrostatic back pressures in the air lines 16 and 17 may not be the same. The line with the least back pressure would rob most of the air from the manifold 14. To inhibit pneumatic cross feed between the air lines, I insert adjustable flow control valves such as 30 and 32 in the air lines. A suitable flow control valve is model 1315-M4B made by HOKE Inc., of Cresskill, N.J. I prefer to adjust the flow rate to 1500 cc/min. However, the actual flow rate that is required will depend on the length and diameter of air lines 16 and 17 and the desired towing depth of the devices so that the flow rate must be determined empirically for each installation. It is preferable to adjust the flow rate so that only very little air bubbles out of the open ends of the air lines as shown at 33 and 35. It is important that the air flow in all of the lines be substantially the same regardless of the depths of individual devices. To that end, air flow meters such as 34 and 36 are installed in each line as shown, for calibration purposes. A flow meter may be permanently installed in each line as shown or a single meter may be temporarily coupled to the open end of each air line in sequence during calibration of the flow valve. A suitable flow meter is model RMA-141-TMV made by Dwyer Instruments Inc. of Michigan City, Ind.

Check valves such as 38 and 40 are inserted in the air lines 16 and 17 between the flow control valves 30 and 32 and the flow meters 34, 36. The check valves provide means for inhibiting water invasion of the manifold 14 as will be described later. They also form part of a low pass filter for preventing highfrequency transients from damaging the pressure transducers next to be described.

Each air line such as 16 and 17 is provided with a pressure transducer such as 42 and 44 (T1, ..., Tn in the drawing). The pressure transducers are of the piezoresistive type electrically arranged in a bridge circuit. They produce an output voltage that is proportional to pressure. The preferred transducers have a resolution of 6 psi/v, a range of 0-30 psi, with a full scale output voltage of 6 v. I prefer to use the model ST2030G1 transducer made by SenSym of Sunnyvale Calif. It should be understood that the transducers must be provided with an external voltage supply which is not shown in the drawing to avoid undue complexity. A reference pressure transducer 46 (R in the drawing) monitors the manifold pressure. Shutoff valves 43 and 45 are provided to cut off air lines that are out of service. By placing the pressure transducers at the manifold, on deck, they are protected from the mechanical shocks that develops each time the sound source fires.

The output voltages from transducers T1, ..., Tn and R are fed to a multiplexer 48. From the multiplexer 48, the analog signals are sampled by sample and hold circuit 50 and fed to an analog to digital converter 52. The resulting digital counts are then sent to a display device or monitor 54 where the gun depths are displayed as a bar graph 55, one column for each gun.

The number of digital counts per volt output of the transducers is, of course dependent upon the resolution of the A/D converter preferred by the user. The multiplexer 48, sample and hold logic 50, and A/D converter 52 may be combined on a single card such as the DAS-8 board made by MetraByte Corp. The card may be installed in one slot of an IBM PC/XT, or other compatible computer, schematically shown as 56. The display device may be connected to an output port of computer 56 in any well-known manner. Computer 56 includes software means of any desired type for deriving the difference between the output voltage of the reference transducer R and the output voltage of any one of the pressure transducer such as T1 to measure the pressure drop across the corresponding flow control valve. The digital counts that are a measure of the pressure drop are converted to equivalent depth counts in terms of desired units of measurement such as feet or meters. In the English system of measurement, the density of sea water provides a conversion factor of 0.440 psi/ft. For fresh or brackish water, the conversion factor might be 0.435 psi/ft. A scaling factor input device such as a simple keyboard input 58 may be used to enter the conversion factor into the computer as needed. The scale factor for water density may be estimated from tabular data, if one knows the ambient water properties, or it may be estimated by use of a salinometer or similar device. The keyboard input thus provides means for combining the estimated water density with the measured pressure drop to determine the water depth at the respective submerged devices.

Before the system is placed into use, the readings of the pressure transducers T1, ..., Tn and R must be calibrated against a standard gauge such as the Omega Instrument Co. Digital Pressure Gauge model PCL-2535-100. To calibrate pressure transducer R, the standard gauge is first connected to the manifold 14 through a suitable tee fitting (not shown) and the manifold is exhausted to zero psi by opening vent line 28. It is necessary to open the vent line because, despite no pressure being applied through line 22, the cracking pressure of a check valve such as 38, is 3-5 psi. That situation would cause a false residual pressure bias in the manifold 14 even through the open ends of the air lines are on deck, exposed to the free air pressure. After the manifold pressure is reduced to zero, the output of the transducer under test is set to 1 v. The pressure in the manifold is next set to 30 psi whereupon the reference transducer output should read 6 v.

With the open ends of the air lines on deck under free air pressure and shutoff valves 43 and 45 open, the standard pressure gauge is connected to each air line in turn through suitable tee fittings; the respective transducers T1, ..., Tn are set to provide 1 v output for zero pressure. Thereafter, the shutoff valves in the respective air lines are closed and the lines are pressurized from the manifold to 30 psi. The transducer output voltages are set to 6 v as with the reference transducer R. Alternatively, the shutoff valves may be left open and the standard pressure gauge may be connected to the open ends of the air lines such as 16 and 17.

Following the transducer calibration procedure, and with the open ends of the air lines still on deck, the flow valves such as 30 and 32 are set so that all provide the same desired flow rate such as 1500 cc/min as measured by the flow meters such as 34 and 36.

In operation, the devices 10 and 11, such as seismic acoustic sources are deployed in the water to a desired depth as disclosed in the reference patents, along with the open ends of the respective air lines such as 16 and 17. The shutoff valves are of course open. Manifold 14 is pressurized to a pressure somewhat greater than the hydrostatic pressure at the gun depth. A typical manifold operating pressure might be 40 psi. As the air slowly trickles out of the open ends of the air lines, timer 26 periodically recharges manifold 14. With the air flow rate properly adjusted for the given installation, the air flow will just compensate for the back pressure due to the hydrostatic water head at gun depth. The difference between the manifold pressure as measured by reference transducer R and the air line pressure as measured by transducers T1, . . . , Tn is the pressure drop across the means for inhibiting pneumatic crossfeed between the air lines, that is, the flow control valves.

When the guns fire, they create a violent high-frequency, high-pressure transient pulse in the water, having a rise time of a few milliseconds. If that pulse were to be applied directly to the pressure transducers, they would be destroyed. I have found that because of the restricted diameter of the air lines and because of the resiliency of the air column therein when blocked off by the check valves such as 38 and 40, the air lines offer a high impedance to high frequency pressure transients although they are responsive to slow changes in ambient water pressure. The air lines, combined with the check valves which block reverse air flow, provide means for damping high-frequency transients thereby to prevent overpressure damage to the pressure-drop measuring means, namely the transducers such as T1. That assembly acts as a low pass filter in response to pressure changes.

Each time that an acoustic source fires, the shock pulse tends to force a water slug up the air line. Repeated firings tend to pump the water slugs into the manifold. The check valves such as 38 form means for preventing water invasion of the manifold when the guns are fired.

When an acoustic source fires, the transducers T1, . . . , Tn will necessarily indicate a false pressure reading. Switching means 60 are provided, interconnected with the gun fire control system 62, to close and to sample the transducer output signals only between source firings which occur every 8 to 20 seconds. In and of itself, the fire control system forms no part of this invention, only the interface switch 60.

Those skilled in the art will consider many variations in the arrangement of the plumbing as disclosed herein, which is presented as exemplary only, but which variations will fall within the scope and spirit of this invention which is limited only by the appended claims.

I claim as my invention:

1. A multiple-unit water depth sensor system for use with a towed array that includes a plurality of oceanographic devices submersed in a body of water, comprising in combination:
   a pneumatically pressurized manifold;
   a plurality of air lines interconnected between the respective devices and said manifold, one end of each said air line being in fluid communication with said manifold, the other end of each said air line being open to the water and secured adjacent a corresponding device;
   each said air line including:
   a. means for establishing a desired flow of air between said manifold and the open end of said air line,
   b. means for inhibiting pneumatic crossfeed between said air lines within said manifold,
   c. means for measuring the pressure drop of the flow of air across said means for inhibiting;
   means for estimating the water density;
   means for combining the estimated water density with the measured pressure drop to determine the water depth existing at the open ends of each of said air lines; and
   means for continuously displaying the so-determined water depth existing at the open ends of each said air line.

2. The water depth sensor system as defined by claim 1, wherein said submersible oceanographic devices are seismic acoustic sources, the sources being adapted to be fired at preselected intervals and including:
   means for protecting the pressure-drop measuring means from over-pressure damage by damping the high-frequency pressure transients that are introduced into the open ends of said air lines when said seismic acoustic sources are fired.

3. The water depth sensor system as defined by claim 2, comprising:
   means for inhibiting water invasion of said manifold.

4. The water depth sensor system as defined by claim 2, comprising:
   means for programming pressure-drop measurements to take place during time intervals between successive firings of said seismic acoustic sources.

5. The water depth sensor system as defined by claim 2, wherein:
   said air lines constitute low pass filters in response to changes in water pressure.

6. The water depth sensor system as defined by claim 2, wherein each said means for inhibiting includes a check valve, and further comprising:
   means for compensating for the cracking pressure of said check valve when calibrating said pressure measuring means.

* * * * *